United States Patent
Zysman et al.

(10) Patent No.: US 7,658,060 B2
(45) Date of Patent: Feb. 9, 2010

(54) LUBRICANT COOLING EXCHANGER DUAL INTAKE DUCT

(75) Inventors: Steven H. Zysman, Amston, CT (US); Craig A. Nordeen, Manchester, CT (US); John E. McCall, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 580 days.

(21) Appl. No.: 11/488,981

(22) Filed: Jul. 19, 2006

(65) Prior Publication Data

US 2008/0016845 A1 Jan. 24, 2008

(51) Int. Cl.
*F02C 7/06* (2006.01)
*F02K 3/04* (2006.01)

(52) U.S. Cl. .................................. 60/39.08; 60/226.1

(58) Field of Classification Search ............... 60/39.08, 60/39.83, 226.1, 262, 266, 267
See application file for complete search history.

(56) References Cited

U.S. PATENT DOCUMENTS

| | | | |
|---|---|---|---|
| 4,254,618 A | * | 3/1981 | Elovic ........................ 60/226.1 |
| 5,203,163 A | * | 4/1993 | Parsons ...................... 60/226.1 |
| 2007/0264133 A1 | * | 11/2007 | Schwarz et al. ............. 417/110 |

* cited by examiner

*Primary Examiner*—Louis J Casaregola
(74) *Attorney, Agent, or Firm*—Kinney & Lange, P.A.

(57) ABSTRACT

A heat exchange system for use in lubricating systems for aircraft turbofan engine equipment in which a lubricant is provided under pressure to spaces bounded at least in part by surfaces moving relative to one another, the heat exchange system for providing air and lubricant heat exchanges to cool the lubricant at selectively variable rates in the engine fan airstreams. A heat exchanger core is provided in a controlled air flow duct system opening at its plural entrances to the engine fan airstreams and having its outlet end opening about at the end of the fan duct nozzle.

10 Claims, 2 Drawing Sheets

LUBRICANT COOLING EXCHANGER DUAL INTAKE DUCT

BACKGROUND OF THE INVENTION

The present invention relates to lubrication systems for turbine engines and for associated equipment, and more particularly, to air and lubricant heat exchangers for use in maintaining desired temperatures of the lubricants in such engines and equipment.

Lubrication systems for turbine engines, such as a turbofan engine, and for associated equipment, such as an integrated drive generator, provide pressurized lubricant, an oil, to lubricate, cool and clean the engine main bearings, gear box gears, and the like, and again for the lubrication of bearings and other parts in equipment associated with such turbine engines. During such lubrications, heating of the lubricant is caused to occur due to mechanical energy losses in the lubricated apparatus. Thermal management of such lubricants is very important for continued successful operation of such lubrication systems in the apparatus lubricated thereby.

The amount of heat necessary to be ejected from lubricants in such systems is increasing because of the use of larger electrical generators, for instance, powered by aircraft turbine engines due to increasing consumption of electrical power in the aircraft powered thereby, and because of the advances in aircraft turbine engines such as the use of geared turbofans for such aircraft with large fan-drive gearboxes. Despite the added heat generated by the such modified and expanded equipment, the necessary lubricating oil operating temperature ranges to provide satisfactory lubricating performance have not changed for the most part and, in some instances, the upper operating temperature limits have been reduced. As lubricant oil heat rejection needs increase, at least some of the lubrication system heat exchangers must also correspondingly increase in capacity or number, or both, meaning an accompanying increase in size thereby increasing the volume in the turbofan engine system that must be devoted to them. This is very difficult to accommodate in the engine core compartment where such exchangers have been typically located in the past due to severe space availability limitations.

The lubrication system for a turbofan engine in an aircraft typically has a first heat exchanger having passageways through which lubricating oil passes to be cooled by the fuel stream flowing past and around these passageways. This arrangement permits the lubricating oil to reject heat therein to the fuel in the aircraft thereby heating that fuel to help recover some of the energy lost in the combustor of the engine. Because in some flight situations more heat is generated in the lubricating oil than can be accepted for warming the fuel, a portion of the lubricating oil can be forced to bypass the heat exchanger for the fuel and the lubricating oil, and the oil can be directed to a further heat exchanger where the heat therein is transferred to the air in the secondary airstream provided by the fan of the turbofan engine. In a typical arrangement, a duct is provided in the fan cowling through which a portion of the airstream is diverted, and the air and lubricating oil heat exchanger is placed in this duct so that the lubricating oil passing through passageways in that heat exchanger is cooled by the duct airstream flowing past these passageways in the exchanger. If such additional cooling of the oil is not needed in a flight situation, the lubricating oil can again be forced to bypass this air and lubricating oil heat exchanger.

However, the fan airstream that is diverted to pass through the lubricating oil and air heat exchanger in such duct systems will develop increased static pressure upstream, or a back pressure from the entrance to the exchanger duct, extending upstream toward the guide vanes and the fan in the fan duct, i.e. a back pressure develops ahead of the exchanger duct entrance. This leads to distortions in the fan airstream and energy losses. Hence, there is a strong desire for an air and lubricating oil heat exchanger duct based system that reduces such losses.

BRIEF SUMMARY OF THE INVENTION

The present invention provides a heat exchange system for use in lubricating systems for aircraft turbofan engine equipment in which a lubricant is provided under pressure to spaces bounded at least in part by surfaces moving relative to one another. The heat exchange system provides air and lubricant heat exchanges to cool the lubricant at selectively variable rates in fan airstreams occurring on a stream side of an engine fan duct wall during at least some operations of the turbofan engine where the fan duct extends between the turbofan engine fan and a fan duct nozzle. This cooling takes place in a cooling duct extending through at least a portion of a stream structure that is positioned adjacent the engine duct wall in the airstreams occurring on the stream side of the engine fan duct wall. The cooling duct has a plurality of duct entrances opening to at least parts of the fan airstreams of the turbofan engine to be forced into the duct during at least some of the operations of the turbofan engine. A flap actuator can force an exit flap to open or close to a selected extent over an exit opening. A heat exchanger core is provided in the cooling duct between the entrance and exit openings thereof that has a plurality of passageway structures therein about which air can pass in flowing therethrough with the passageway structures being coupled to an input conduit at one end thereof and coupled to an output conduit at an opposite end thereof to enable the lubricant to be provided, and removed from, interiors of the passageway structures through interiors of the input and output conduits.

DETAILED DESCRIPTION

Locating the air and lubricant heat exchanger in a duct in the space typically available in the turbofan engine pod nacelle lower bifurcation which is subjected to the fan airstream thereby incorporates this bifurcation structure into the lubricant cooling system and so avoids the duct and exchanger taking up scarce space in the core engine compartment. Further, splitting the portion of the fan airstream flowing in the fan duct of a turbofan engine that is to enter the air and lubricant heat exchanger duct into two substantially equal halves can be accomplished through providing two exchanger duct entrances opening into the fan duct. Such an arrangement reduces the back-pressure distortion upstream in the fan airstream at the turbofan engine fan by backing up less air at each than would backed up at just one entrance location. The "nose" structure formed between the two duct entrances to separate them from one another can house and protect various engine fluid transfer conduits and electrical wiring that must extend across the heat exchanger duct.

Figure 1:
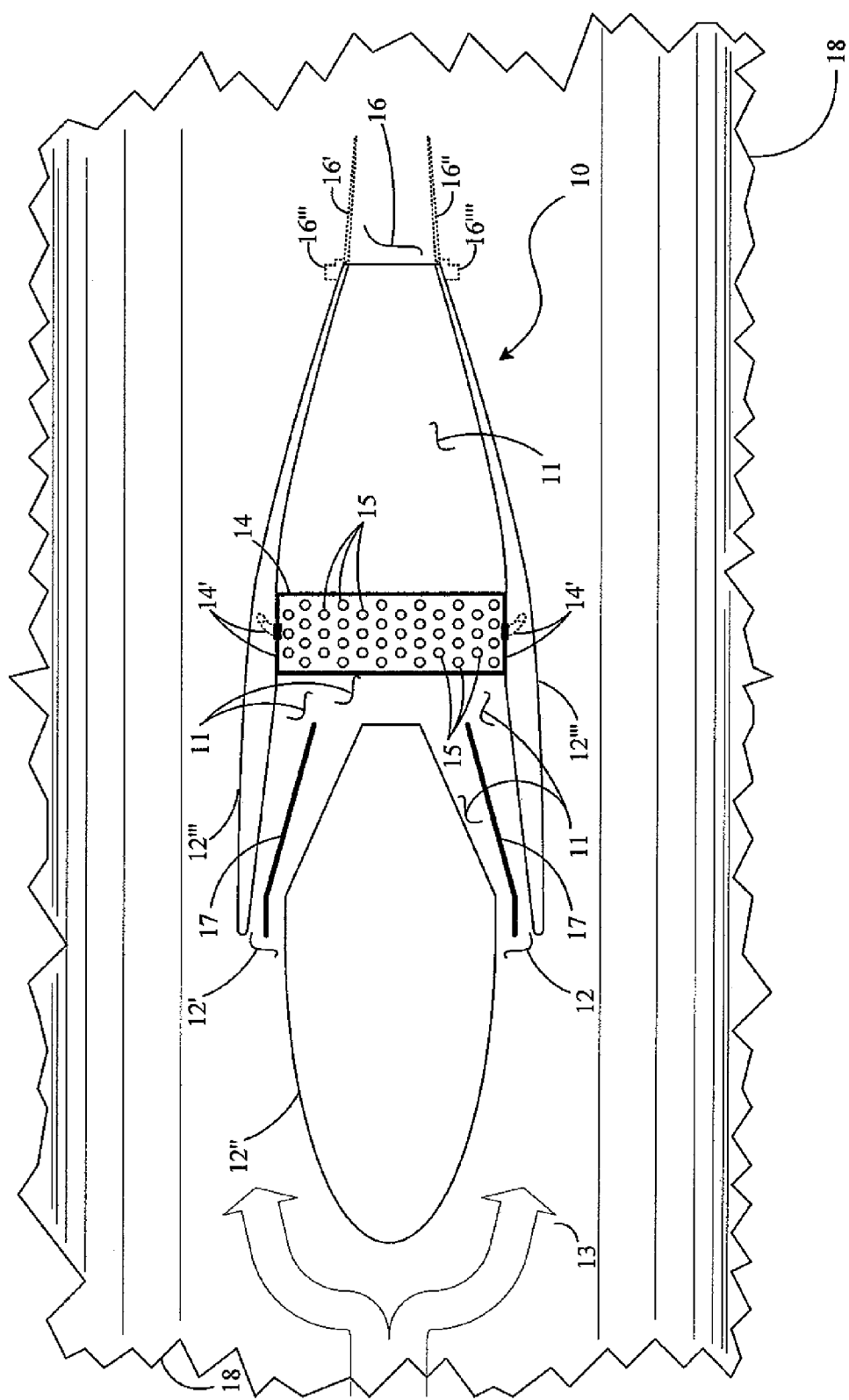
FIG. 1 shows a bottom view partially cut away of a turbofan engine fan duct lower bifurcation structure embodying the present invention.

Thus, in FIG. 1, there is shown a bottom fragmentary view of a fan duct lower bifurcation structure, 10, that is shown affixed to an inner fan duct wall thereabove without any cowling structure being shown below. Bifurcation structure 10 has an airstream duct, 11, beginning from each of two duct inlets or entrances, 12 and 12', separated from one another by a "nose" structure, 12", extending from outside of duct 11 on the turbofan engine fan side thereof into duct 11. Duct 11 further has entrances 12 and 12' formed by lower bifurcation structure walls, 12''', and extends in this bifurcation structure from these entrances over its remaining length to the opposite ends of walls 12'''. An airstream, 13, from a portion of the turbofan engine fan airstream, or fan stream, is divided more or less equally to enter duct 11 at inlets 12 and 12' and to then pass through a heat exchanger, 14. Heat exchanger 14 uses airstream 13 to cool lubricating oil in the engine lubrication system forced under pressure through a plurality of oil carrying tubes, 15, that are suitably connected into the lubrication system through appropriate conduits so as to allow oil therein to flow through these tubes. Thus, exchanger 14 has two outer conduit cap portions, shown about the two ends of tubes plurality 15, which merge into, or are attached to, hose portions to form these conduits 14 extending to the rest of the lubrication system through walls 12'''. These two conduits each can be either an input or an output conduit depending on the direction that the lubricating oil is forced to take in flowing through exchanger 14.

The exchanger duct air flow 13 entering the heat exchanger duct from entrances 12 and 12' on the opposite sides of the duct requires that less air be turned substantial angles to be able to flow across the entire front of the heat exchanger than would be required with the use of just a single duct entrance. Larger turning angles causes the air to have a higher probability of separating from a guiding side of a duct thereby leading to turbulence and vortexes occurring in the duct downstream of the separation with resulting energy losses that are avoided by the use of two entrances. These two entrances have a relatively narrow opening but then diverge in volume to allow the entering fan airstream to slow from approximately 770 ft/s through diffusion into this added volume to around 100 ft/s before passing through the heat exchanger.

This reduced speed air 13 flows about tubes or passageways 15 of heat exchanger 14 to which the lubricant is delivered and through which the heated lubricant flows to subsequently be introduced to the remainder of the lubricating system. Airstream 13 portions flow about, and then past, those tubes to reach an exit, 16, of duct 11 which has a suitably chosen exit cross sectional area magnitude for enhancing the thrust produced by the heated air passing through heat exchanger 14 and exit 16. In one alternative, as indicated above, this exit cross sectional area magnitude can be varied by providing a controller (not shown) operating exit flaps, 16' and 16", shown in dashed line form in FIG. 1, through operating respective flap controllers, 16''' and 16''''.

A splitter vane can be introduced at each of the two entrances to extend into the diffusion region beyond that entrance to guide the flow toward the heat exchanger with even less turning of that flow while also protecting the heat exchanger from any ice or hail gaining access to the entrances. Entrances 12 and 12' are shown in FIG. 1 having splitting vanes, 17 and 17', starting therefrom, respectively, to extend into duct 11. These vanes thus extend toward heat exchanger 14 from these inlets but are bent or curved toward one another to more or less divide equally the volume on either side thereof between the outer walls of bifurcation structure 10 and the outer walls of inlets 12 and 12' interior to duct 11.

The duct portion past, or downstream from the heat exchanger, converges smoothly toward duct exit 16 which is positioned near the end of the fan duct. The rate of air flow through the entire exchanger duct is set by the high pressure air leaving the fan and the low pressure external air at the duct exit. The exchanger duct and heat exchanger system can be optimized by suitably selecting the duct entrances and exit areas such that internal pressure losses, including those across the heat exchanger, and the energy losses due to the external friction drag of the ducting is compensated by the thrust produced by the heated air leaving the duct at its exit. In furtherance of this optimization insofar as maximizing the thrust recovery of this system, a variable area nozzle can be provided at the duct exit comprising moveable flaps 16' and 16" that can move toward one another to decrease the effective duct nozzle area, or oppositely to increase that area, as determined by a suitable controller operating such flaps to thus control the flow of air through the duct and exchanger. The controller, to do so, sets the nozzle area in accord with related parameters and conditions as measured by corresponding sensors such as engine fan revolution rate, surrounding atmosphere temperature, and lubricating oil temperature.

Figure 2:
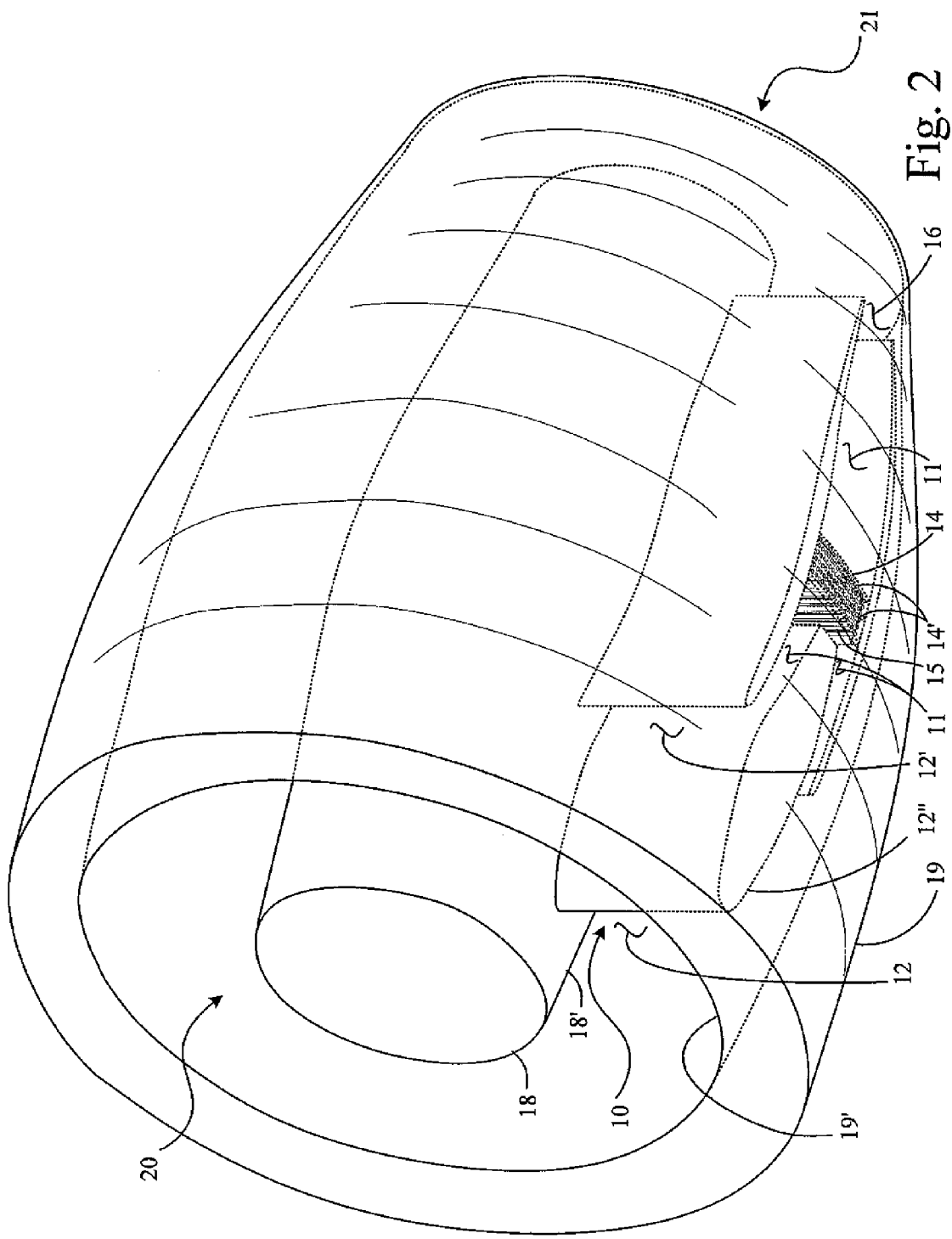
FIG. 2 shows a perspective side view partially cut away of a turbofan engine and an alternative representation of the turbofan engine fan duct lower bifurcation structure of FIG. 1 embodying the present invention.

Bifurcation structure 10 is positioned between the outside of the bottom of the wall of an engine nacelle, 18, forming the inner fan duct wall, 18', and the inside of the bottom of the wall of an outer cowling or fairing, 19, of the engine pod for a turbofan engine, 20, forming the outer fan duct wall, 19', as indicated in FIG. 2. FIG. 2 shows a perspective view of part of the engine pod with the front of engine 20 and the front of cowling 19 having been cut away. As can be seen, exit 16 of duct 11 in bifurcation structure 10 is positioned at the exit, 21, of cowling 19 which is the fan duct nozzle at the end of the fan duct extending to there from the fan (not shown) of turbofan engine 20. In this view, splitting vanes 17 and 17' have been chosen in the alternative to be omitted as have flaps 16' and 16".

Although the present invention has been described with reference to preferred embodiments, workers skilled in the art will recognize that changes may be made in form and detail without departing from the spirit and scope of the invention.

The invention claimed is:

1. A heat exchange system for use in lubricating systems for aircraft turbofan engine equipment in which a lubricant is provided under pressure to spaces bounded at least in part by surfaces moving relative to one another, the heat exchange system for providing air and lubricant heat exchanges to cool the lubricant at selectively variable rates in fan airstreams occurring on a stream side of an engine fan duct wall during at least some operations of the turbofan engine where the fan duct extends between the turbofan engine fan and a fan duct nozzle, the system comprising:

a cooling duct extending through at least a portion of a stream structure that is positioned adjacent the engine fan duct wall in the airstreams occurring on the stream side of the engine fan duct wall, the cooling duct having a plurality of duct entrances separated from one another and each opening to at least some part of the fan airstreams of the turbofan engine and further having an exit opening about at the end of the fan duct; and a heat exchanger core provided in the cooling duct between the entrance and exit openings thereof and having a plurality of passageway structures therein about which air can pass in flowing therethrough with the passageway structures being coupled to an input conduit at one end thereof and coupled to an output conduit at an opposite end thereof to enable the lubricant to be provided, and removed from, interiors of the passageway structures through interiors of the input and output conduits.

2. The system of claim 1, further comprising a moveable exit flap capable of at least in part covering a portion of the exit opening of the cooling duct, and a flap actuator which can force the exit flap to open or close to a selected extent over the exit opening.

3. The system of claim 1 wherein said stream structure is a fan duct lower bifurcation structure positioned between the bottom of the wall of an engine nacelle and the bottom of the inner surface of the wall of an outer cowling of an engine pod containing the turbofan engine.

4. The system of claim 1 wherein members of an adjacent pair of the plurality of duct entrances are separated by a separation structure extending in part outside of the cooling duct toward the fan and extending in part into the duct toward, but short of, the heat exchanger.

5. The system of claim 4 further comprising a pair of splitting vanes each in a corresponding one of the members of the adjacent pair of the plurality of duct entrances and each extending toward the heat exchanger so as to be positioned to divide the space between the duct and the nearest side of the separation structure.

6. The system of claim 2 wherein said stream structure is a fan duct lower bifurcation structure positioned between the bottom of the wall of an engine nacelle and the bottom of the inner surface of the wall of an outer cowling of an engine pod containing the turbofan engine.

7. The system of claim 6 wherein the exit flap is positioned at the end of the fan duct lower bifurcation structure and is rotatable about an axis intersecting substantially the bottom of the wall of the engine nacelle and the bottom of the inner surface of the wall of an outer cowling.

8. A heat exchange system for use in lubricating systems for aircraft turbofan engine equipment in which a lubricant is provided under pressure to spaces bounded at least in part by surfaces moving relative to one another, the heat exchange system for providing air and lubricant heat exchanges to cool the lubricant at selectively variable rates in fan airstreams occurring on a stream side of an engine fan duct wall during at least some operations of the turbofan engine where the fan duct extends between the turbofan engine fan and a fan duct nozzle, the system comprising:

a cooling duct extending through at least a portion of a stream structure that is positioned adjacent the engine duct wall in the airstreams occurring on the stream side of the engine fan duct wall, the cooling duct having a duct entrance opening to at least some part of the fan airstreams of the turbofan engine and further having an exit opening about at the end of the fan duct;

a heat exchanger core provided in the cooling duct between the entrance and exit openings thereof and having a plurality of passageway structures therein about which air can pass in flowing therethrough with the passageway structures being coupled to an input conduit at one end thereof and coupled to an output conduit at an opposite end thereof to enable the lubricant to be provided, and removed from, interiors of the passageway structures through interiors of the input and output conduits; and an air flow diverter structure extending from outside of the cooling duct through the duct entrance opening into the cooling duct.

9. The system of claim 8 wherein an exit opening of the cooling duct is located adjacent the fan duct nozzle.

10. The system of claim 9 further comprising a moveable exit flap capable of at least in part covering a portion of the exit opening, and a flap actuator which can force the exit flap to open or close to a selected extent over the exit opening.

\* \* \* \* \*